May 26, 1970  A. K. ROSENBLOM  3,513,530
METHOD FOR NAILING TOGETHER MOLDING BOARDS
IN THE CONSTRUCTION OF MOLDS
Filed Nov. 6, 1967  4 Sheets-Sheet 1
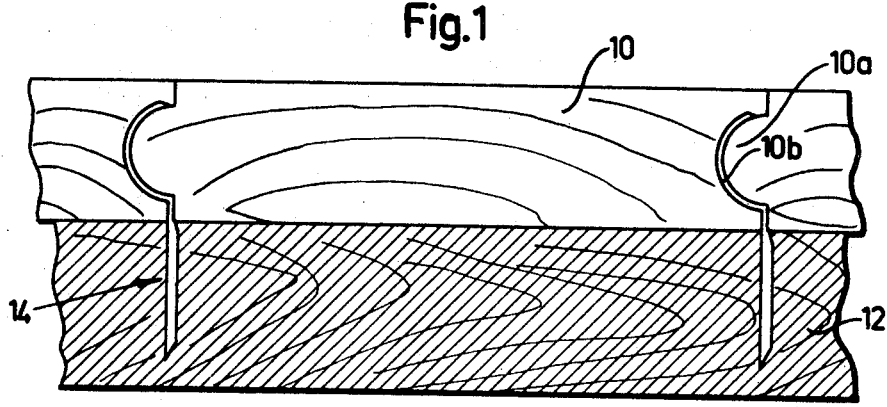
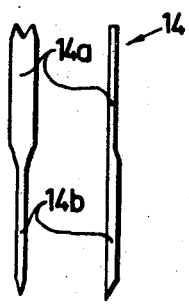
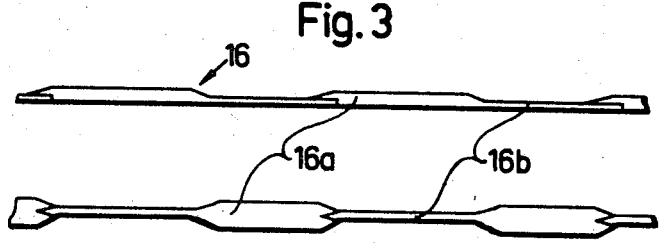
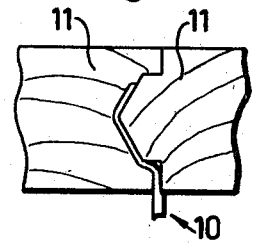
INVENTOR
AXEL KARL ROSENBLOM
BY
Woodhams, Blanchard & Flynn
ATTORNEYS

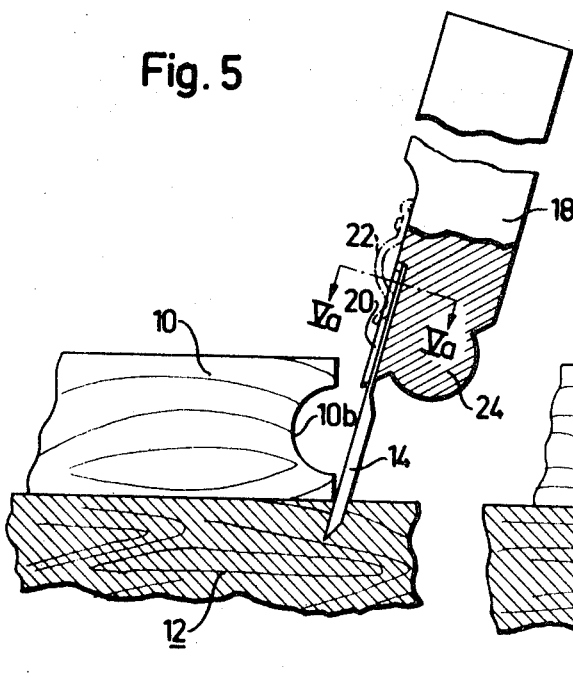

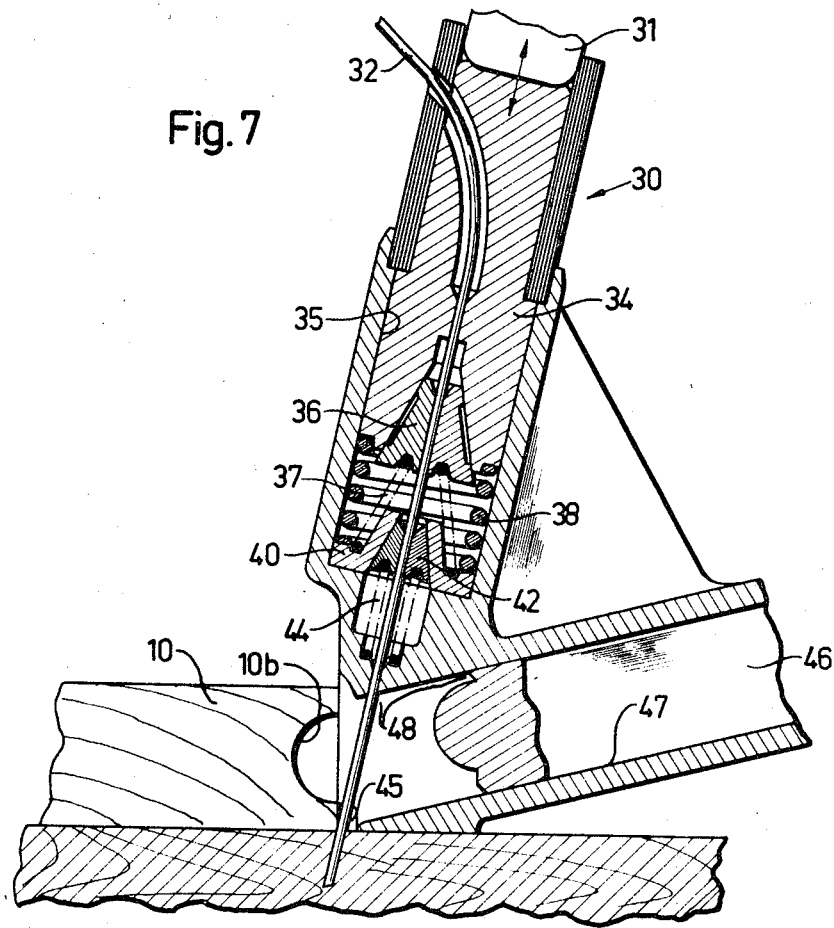
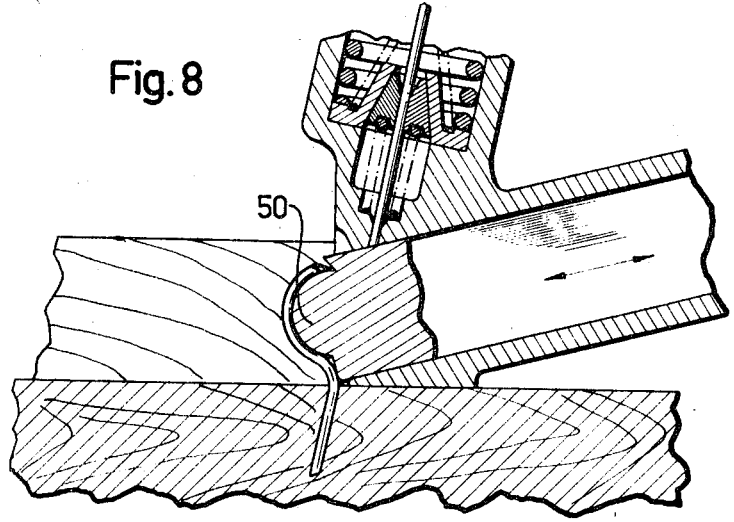

May 26, 1970   A. K. ROSENBLOM   3,513,530
METHOD FOR NAILING TOGETHER MOLDING BOARDS
IN THE CONSTRUCTION OF MOLDS
Filed Nov. 6, 1967   4 Sheets-Sheet 4
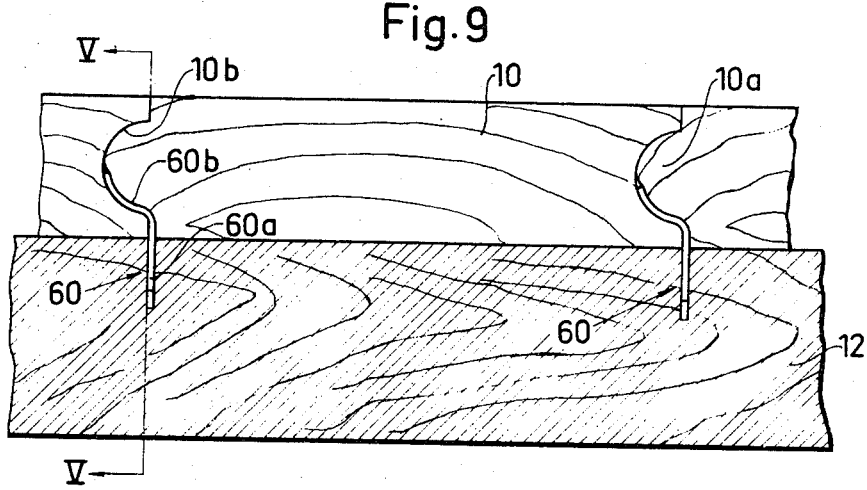
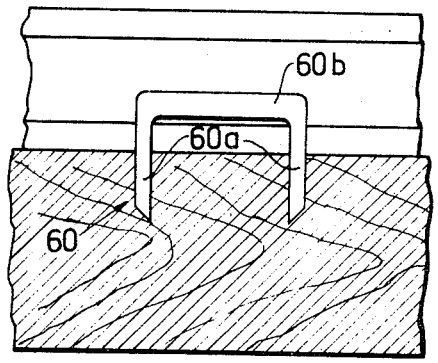
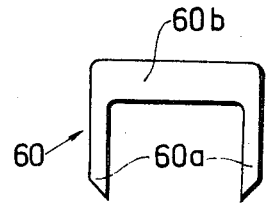
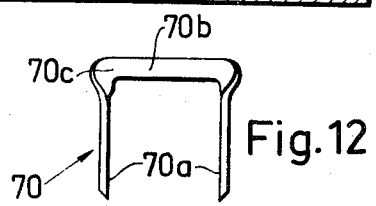
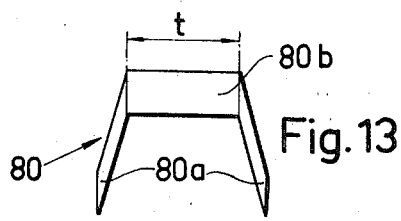
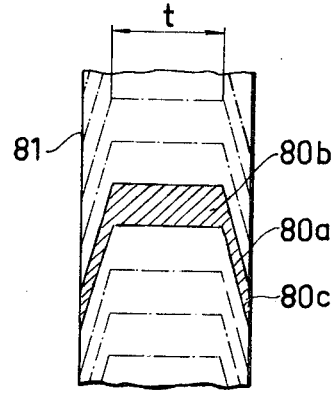
INVENTOR
AXEL KARL ROSENBLOM
BY
Woodhams, Blanchard & Flynn
ATTORNEYS United States Patent Office 3,513,530
Patented May 26, 1970

3,513,530
METHOD FOR NAILING TOGETHER MOLDING BOARDS IN THE CONSTRUCTION OF MOLDS
Axel Karl Rosenblom, Capellavagen 18, Lidingo 1, Sweden
Filed Nov. 6, 1967, Ser. No. 680,797
Int. Cl. B23p 17/00
U.S. Cl. 29—417                                4 Claims

ABSTRACT OF THE DISCLOSURE

Method and means for building concrete molds, the mold boards of which are fitted together by means of a tongue and groove joint and which are secured in position by specially designed nails; wherein the nails do not penetrate through the boards, as with conventional constructions of this nature, but engage in the joint itself in such a way that the two mating portions of the mold boards are clamped against the underlying crossbar. The invention also consists of suitable apparatus for fastening the nails in this manner.

BACKGROUND OF THE INVENTION

The present invention is concerned with molds constructed of molding boards for producing concrete casts; and relates more particularly to a method and means for nailing the molding boards to the supporting crossbars or base of the mold.

In spite of all attempts during recent years to rationalize methods by which molds used for casting concrete are constructed, no great advances have been made in this particular field of the building technique, excepting of course in the case of special all steel molds or frames used for mass producing identical and reoccurring building elements. These molds, however, are expensive. When concerning "tailor-made" constructions, such as bridges, viaducts, road arches, underpasses, etc. it is still necessary, and will probably remain so for some time to come, to use molds made of molding boards, either loose or secured to so-called mold wickets, which can be nailed to the mold base.

The construction of molds is accompanied by a number of relatively difficultly resolved economic problems. Firstly, the wood used to construct the mold can seldom be considered purely as a consumer article, in view of the constantly increasing price of wood, but in the majority of cases must be used over and over again. However, when concerned with matched wood, i.e., wood joined by corresponding tongues and grooves, it is often difficult to economize in this manner since the guiding and connecting tongue-groove joint on such boards is all too weak; when dismantling a mold constructed according to this principle, the tongues and also the strips surrounding the grooves are often broken. In this respect an important improvement has been provided in the form of the special molding board described in the Swedish Pat. No. 187,773. In the board according to this specification the tongue-groove joint is of a special design and is extra strong and sturdy, and a mold constructed of such boards can be dismantled easily, without damage to the tongue or groove strips.

A more difficult problem is the nailing together of the mold. It is unavoidable when dismantling a mold which has been nailed together in the conventional manner, that the nails will remain in the boards. These nails must naturally be removed before the boards or framework can be used again. Removal of such nails is time consuming and, particularly with regard to present wages, is an expensive work and constitutes an undesirable economic load in all mold constructing work.

The object of the present invention is to provide a novel and improved method of nailing together molds for casting concrete, and also to suggest appropriate means and auxiliary appliances to assist in putting the new method into effect. This object is realized, and in consequence thereof the above-mentioned disadvantages associated with the construction of molds are eliminated, in that the method according to the invention has obtained the characteristic features disclosed in the claims.

It has been found that inter alia, the molding boards described in the aforementioned patent can be used to great advantage in conjunction with the method according to the present invention and hence the said method will be described in conjunction with its application when constructing a mold comprising such molding boards.

BRIEF DESCRIPTION OF THE DRAWING

FIG. 1 is a cross-sectioinal view through a number of molding boards secured to a supporting crossbar by means of the method according to the invention.

FIG. 2 is a plan and side view of a specially designed nail, which can be used when practicing the method according to the invention.

FIG. 3 is a plan and side view, which illustrates a mehod of producing the nail according to FIG. 2.

FIG. 4 is a cross section of one detail, which illustrates how molding boards presenting tongue-groove joints of a modified design are nailed together according to the invention.

FIG. 5 is a side view, partly in section, which illustrates how nailing of the boards according to the invention is effected by means of a special holder or nail drift.

FIG. 5a is a detailed cross section through the line Va—Va in FIG. 5, and illustrates how the nail used is positioned in the holder.

FIG. 5b is a cross section similar to FIG. 5a but shows a modified form of nail in the holder.

FIG. 6 is a cross section of a detail, and illustrates how the holder according to FIG. 5 is used to drive the blade portion of the nail into the groove of the molding board.

FIGS. 7 and 8 show diagrammatically a cross section through a pneumatic apparatus for continuously nailing the boards in position, according to the invention.

FIG. 9 is a cross section corresponding to FIG. 1, but illustrates how the molding boards are secured by means of securing means of the so-called staple type.

FIG. 10 is a cross section through the line X—X in FIG. 9.

FIGS. 11–13 are plan views of various embodiments of staples used in this type of nailing operation, and finally FIG. 14 illustrates a method of mass producing the staples shown in FIG. 13.

DESCRIPTION OF THE PREFERRED EMBODIMENTS

FIG. 1 illustrates a cross section through a portion of a mold intended for casting concrete and which is made up of boards 10, designed according to the aforementioned Pat. No. 187,773 and joined together by means of the method according to the invention; the boards being secured to underlying crossbars 12. In this instance, the boards are provided with semiround tongues 10a engaging in corresponding grooves 10b. The essence of the invention resides in that instead of nailing the boards to the crossbars in the normal manner, i.e., by causing nails to pass through the joined portions, the boards are joined by means of the specially designed nails 14, which engage between said boards, in the joints between the same as shown in FIG. 1. In this connection the nails 14 engage the bottom of the grooves 10b of the boards, and are given a special design so that the space occupied by the nail in the female portion of the joint is the least possible. The nail is designed as a normal wood nail along approximately half its length, and this portion of the nail 14b is driven into the crossbar 12. The remaining portion 14a of the nail 14 is flattened to form a blade-like shape and when the nail is driven into the wood, this portion is urged into contact with the groove bottom 10b, as can be seen from FIG. 1. Upon completion of this operation the next following board 10 is mounted, with the tongue 10a of the said board engaging in the groove 10b in which the blade portion 14a of the nail is engaged, and is knocked or hammered into firm engagement. The nail 14 is thus locked with its blade portion 14a fixed between the mold boards. When this mold is dismantled and the crossbars broken loose the nails will, in the large majority of cases, be drawn out of the crossbars, to be completely loosened when the boards are taken apart. Any nails remaining in the crossbars can be reached easily for removal and the difficult and laborious work required to remove nails which would otherwise have been driven into the boards is entirely eliminated.

With regard to the used "blade nail" 14, this can be made of a wire material by subjecting said material to successive pressing operations, e.g., as shown in FIG. 3; the portions 16a being broadened by cold working at the same time as a point is formed on the end of the nail. If desired, the nails may be in the form of a long continuous string, to be broken off one at a time at a tear line between the point of one nail and the shank end or leg end of the adjacent nail.

As will be evident from the said patent the molding board 10 may also be provided with a tongue and groove profile, different to the shown semiround profile and which for instance, may present a hexagonal or an octagonal cross section. This design does not, of course, change the principle by which the boards are nailed together according to the invention; in actual fact a firmer "grip" can be expected if the blade portions of the nails are folded around the profile edges of the groove strips, see FIG. 4. Further, the tongue need not fully conform with the groove; a small clearance can be left at its bottom portion between tongue and groove, for receiving the nail. Finally, in certain instances a nail may be used which resembles a common wood nail but with the head removed, i.e., a nail presenting a constant cross section.

The operation of driving the blade nail 14 into the crossbar 12 cannot, of course, be effected by a simple "hammering" as in the case of conventional nailing operation, since the blade portion 14a is not sufficiently rigid to withstand direct hammer strokes, but buckles. However, nailing can be effected quite easily with the assistance of appropriate holder means, of which an example is given in FIG. 5. The illustrated holder 18 comprises a prismatic iron drift, presenting on its one side a groove 20 extending from one end and having undercut edges 20a. The blade portion 14a is inserted in this groove, as can be seen from FIGS. 5 and 5a. If desired, a resilient retaining clip 22 may be arranged; the clip holding the nail portion 14a in the groove 20 by its spring action and friction. The nail can now be easily driven into the supporting crossbar 12 adjacent the edge of the molding board, as is illustrated in FIG. 5.

The holder 18 is also appropriately shaped at the end so that this portion conforms with the groove-presenting edge of the molding board, and hence presents a bulge 24, which fits into the groove 10b. The blade portion 14a of the nail 14 can be driven into the groove and the board fixed by simply turning the drift; as shown in FIG. 6. As is evident from FIG. 6 hammer strokes applied to the drift will be directed obliquely downward, whereby the board is urged against the crossbar and knocked more securely against adjacent boards.

It is also possible to give the blade portion of the nail 14 an arched cross section, as is shown in FIG. 5b at 14a'. This design makes the nail more rigid against longiturinally directed blows, whilst the flattening and bending of the blade portion when driven into the groove of the board is not appreciably counteracted.

The method according to the invention may also be effected with the assistance of quick-operating and effective mechanical arrangements. In this connection both intermittently and continuously functioning devices can be conceived. The expression "intermittently" working devices or apparatus is meant to indicate such which drive the finished nails into position subsequent to the nails being fetched from a magazine. The apparatus is loaded with a number of nails in the form of a suitable packet or stack, the nails for instance being joined together and arranged relative to one another by means of plastic joints, strips or the like of a known type. Nailing is then effected by engaging the blade portion of a nail in the groove of the molding board as described above, by means of pneumatic or electrical feeding and hammering devices, for instance.

The expression "continuously" working apparatus, which is conceived as representing auxiliary devices which allow the method according to the invention to be utilized in the most rational manner possible is meant to indicate such which continually "nail" a continuous metal strip, which is cut into suitable lengths, piece by piece, in connection with the operation of driving the cut portion into the groove of the molding board. FIGS. 7 and 8 diagrammatically illustrate the possible design of such a pneumatically operated apparatus, although it is emphasized that the invention is in no way restricted to this embodiment but that several structural possibilities are conceivable within the scope of the invention.

The apparatus shown in FIGS. 7 and 8 is pneumatically operated according to the same principle as that used in conventional pneumatic hammers, this mode of operation being chosen principally for two reasons. Firstly, a continuous metal strip of uniform cross section can be used for nailing, the length-width relationship of said cross-sectional area being assessed so that on one hand the strip can be driven into the wood without difficulty but on the other hand does not occupy too much space in the joint between the mold boards. A strip-nail of this type is quite easily subjected to fracture or caused to collapse under all conditions, if it is driven in by "long" strokes. The rapid, short strokes caused in pneumatic hammering, however, can be absorbed by the nail without it breaking. Secondly, the pneumatic hammer is capable of developing a high hammering effect, which means that the strip nail, even though for the above reasons it must present a certain thickness, which is greater than the blade portion 14a of the above-described strip nail 14, can be sunk into the bottom of the groove of the mold board with the assistance of the pneumatic hammer quite simply, and consequently the nail does not occupy excess space in the joints between the mold boards, nor does it prevent their being joined tightly together.

The pneumatic nailing tool 30 illustrated diagrammatically in FIGS. 7 and 8 comprises two parts, namely a nailing part and a bending part. A metal strip 32 presenting a suitably adapted wire-nail like profile is passed from a drum (not shown) in toward the center of a feed sleeve 34; as shown in FIG. 7. Engaged in the lower end of the feed sleeve 34 are jaws 36 which are urged against a conical seating in the feed sleeve 34 by means of a spring 37; whereby the jaws engage about the strip 32. When the sleeve 34 is lowered the strip is gripped by wedge action in a known manner and is forced to follow the sleeve. The sleeve is engaged in a guide 35, in the lower end of which is arranged a locking sleeve 40. The sleeve 40 houses in a conical seating non-return jaws 42 which are held urged against the strip by a spring 44 and which through the intermediary of wedge engagement lock the strip against upward movement, i.e., return movement. A powerful bias spring 38 is inserted between the sleeves 34 and 40 and hold the same in abutment with suitable shoulders at the ends of the guide 35. The assemblies 34-44 thus comprise a strip feeding arrangement working in short stages and preventing return movement of the strip, and because the feed sleeve 34 is subjected to rapid downwardly directed blows by a pneumatic hammer 31 the strip 32 is fed successively out from the tool, whereupon it is passed through an opening 45, see FIG. 7, arranged in one outer corner portion of the tool, which portion, as shown in the figures, is adapted to be placed against the edge of the mold board so that a suitable portion of the nail can be driven into the underlying crossbar.

The upsetting or bending portion of the tool includes a shaped, pneumatic hammer plunger 46 arranged in a guide 47 located under the feed portion of the tool and in the working position directed obliquely downward toward the edge of the mold board, see FIGS. 7 and 8. During the driving in of the nails the hammer plunger 46 is located in a somewhat withdrawn position, as shown in FIG. 7, and when the action of driving in the strip has terminated the plunger is thrown forward and cuts the strip, as indicated at 48. The stump portion of the strip projecting out of the crossbar is driven into the groove of the mold board and the hammer plunger 46 effects a series of rapid hammering movements to sink the upset nail portion in the bottom of the groove, as shown in FIG. 8. By means of this concluding series of hammer blows, during which the mold board is subjected to a number of forces directed obliquely downward, the said board is caused firmly to abut the underlying crossbar and the neighboring board situated on the opposite side. Naturally, clipping or cutting of the strip can be effected by a series of hammering movements.

It is also possible within the scope of the invention to provide other, for instance electrically operated, nailing apparatus (e.g., vibrating mechanisms) and other designs than the one described above are conceivable to the designer having normal skill in the art.

It should also be mentioned that a light hand-operated and magazine-fed apparatus can be produced, which geometrically conforms with the motor-driven apparatus shown in FIGS. 7 and 8. The blade nails according to the invention can be joined together in a manner similar to that of the staples used in stapling apparatus, by means of plastic or the like, to form packets or stacks which can be introduced into a magazine in the apparatus. The pneumatic feed mechanism shown in FIG. 7 is then replaced by a simple laterally operating magazine-feed arrangement, and the nails are driven downwardly by means of a plunger, which in turn is actuated by hammer strokes from without. A plunger similar to plunger 46 in FIG. 7 is used, which is also acted upon by hammer blows from without, for the purpose of bending the nail in the groove. The method according to the invention and the nails, strip nails and other mechanical appliances used when practicing the method according to the invention are not restricted to the shown embodiments but can be varied and modified in various respects.

FIGS. 9–14 illustrate how the method according to the invention is practiced when using securing means designed as staples. In principle the mold boards are secured in the same way as described above, i.e., the staples engage in the bottom of the grooves 10b of the boards, the engagement in this instance preferably being restricted to the lower portion of the groove bottom, as shown in FIGS. 9 and 10. In this instance at least the engaging portion of the staples, i.e., their stirrup portion or crosspiece 60b, is flat or flattened so that the staple does not encroach upon the joint space and prevent the insertion of adjacent board tongues. The legs 60a of the staples are driven into he underlying crossbar, and the arrangement can be understood quite clearly from FIGS. 9 and 10. The mold boards 10 are held securely against the underlying crossbar 12 by means of the crosspieces 60b of the staples, folded into the grooves, the said crosspieces being flat and driven somewhat or sunk into the wood so that the tongues 10a of the adjacent board can be inserted without obstruction into the grooves 10b, the staples 60 and their leg portions 60a being securely locked between the mold boards. When the mold is later disassembled upon completion of the casting operation and the crossbars broken loose, the staples, similar to the above-described nails, are drawn out of the crossbars, to be completely loosened when the boards are taken apart. It should be noted that any staples 60 remaining in the crossbars can be easily reached for removal; the stirrup portions projecting above the crossbars can be easily engaged by a pointed tool.

FIGS. 11–13 illustrate a number of staples suited for use when practicing the method according to the invention. The staple 60 shown in FIG. 11 is made of pressed sheet material, the width of the legs 60a and the crosspiece 60b being adapted so that the staple can be driven in without bending or buckling and so that it can be bent into the board groove 10b without difficulty. The ends of the legs 60a are suitably cut obliquely as shown in FIG. 11 so that they can be driven into the wood more easily.

FIG. 12 shows a securing staple 70 according to the invention designed as a so-called wire staple, i.e., one that is made of bent wire. In this instance, however, the crosspiece 70b and adjacent leg portion 70c is flattened to facilitate the bending of the staple in the groove 10b and so that it occupies the least possible space therein.

A third embodiment 80 of the staple according to the invention is shown in FIG. 13. This staple is suited for automatized mass production from a metal strip, as shown in FIG. 14. For this purpose the legs 80a are spaced somewhat apart with sloping, parallel edges, and the crosspiece 80b has the same width externally and internally, see FIG. 13. This design enables the staples to be punched out of a metal strip 81 without wastage, and can be seen clearly from FIG. 13. Further, a sharp leg point is automatically obtained at 80c.

A number of additional staple shapes are conceivable within the scope of the invention, and it should be possible with the guidance of the aforegoing for one having normal skill in the art to produce such staples. It is also possible to increase the rigidity of the staple or its resistance to folding on being driven into the wood, by providing particularly the legs of the staple with basic embossments, edge flanges and the like and even by somewhat arching the complete staple.

A number of pneumatic or electrically operated stapling apparatus are known, and the majority of such apparatus can be modified without difficulty for driving in the mold securing staples according to the invention. This modification involves firstly an adjustment according to the special design of the novel staple, and secondly that the apparatus is made capable of effecting an upsetting or bending movement, i.e., driving or bending the crossportion of the staple and the leg portions thereof immediately adjacent said crossportion into the groove of the mold board, substantially as described in the foregoing.

The invention is naturally not restricted to the described and illustrated embodiments, but can be varied arbitrarily within the scope of the following claims.

The embodiments of the invention in which an exclusive property or privilege is claimed are defined as follows:

1. A method of joining molds for casting concrete or other material used for building purposes, comprising the steps of:

providing a plurality of framework elements, said elements being provided with a tongue adjacent one end thereof and a groove adjacent the other end thereof;
positioning one of said elements on a support surface so that a side surface of said element at least partially contacts said support;
driving a fastening member into said support directly adjacent said other end of said element with said fastening member having an upper portion extending above said support and positioned closely adjacent said other end of said element;
deforming said upper portion of said fastening member so that same extends into the groove formed in said other end of said element; and
positioning a further framework element closely adjacent said one framework element so that the tongue of said further element extends into the groove of said one element with said deformed upper portion of said fastening member being positioned therebetween.

2. The method according to claim 1, characterized in that the fastening member is metal wire, which is driven into the support and thereafter cut into a suitable length.

3. The method according to claim 1, characterized in that the fastening member comprises separate pins.

4. The method according to claim 1, characterized in that the fastening member comprises staples, the leg portions of which are driven into the support adjacent the grooved edge of the mold element, whereon at least the stirrup positions of the staples are pressed into the groove into abutment with its bottom portion.

References Cited
UNITED STATES PATENTS

| | | | |
|---|---|---|---|
| 2,037,838 | 4/1936 | Van Uum et al. | 29—417 |
| 3,348,669 | 10/1967 | Powers | 29—417 X |

CHARLIE T. MOON, Primary Examiner

V. A. Di PALMA, Assistant Examiner

U.S. Cl. X.R.

29—432; 85—10; 227—80